(12) United States Patent
Blair et al.

(10) Patent No.: US 12,404,218 B2
(45) Date of Patent: Sep. 2, 2025

(54) ARTICLE WITH SURFACE STRUCTURES FOR CMAS RESISTANCE

(71) Applicant: Rolls-Royce Corporation, Indianapolis, IN (US)

(72) Inventors: Taylor K. Blair, Indianapolis, IN (US); Ted J. Freeman, Indianapolis, IN (US); Aaron Sippel, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 325 days.

(21) Appl. No.: 17/646,551

(22) Filed: Dec. 30, 2021

(65) Prior Publication Data
US 2023/0212086 A1    Jul. 6, 2023

(51) Int. Cl.
*C04B 41/50* (2006.01)
*C04B 35/80* (2006.01)
*C04B 41/45* (2006.01)
*C04B 41/87* (2006.01)

(52) U.S. Cl.
CPC .......... *C04B 41/5024* (2013.01); *C04B 35/80* (2013.01); *C04B 41/459* (2013.01); *C04B 41/87* (2013.01); *C04B 2235/9669* (2013.01)

(58) Field of Classification Search
CPC ... C04B 41/5024; C04B 35/80; C04B 41/459; C04B 41/87; C04B 2235/9669; C04B 41/009; C04B 41/5042; C04B 35/573; C04B 41/53; C04B 2103/0021; F23R 3/007; F05D 2240/11; F05D 2240/12; F05D 2240/30; F05D 2250/11; F05D 2250/181; F05D 2250/182; F05D 2250/183; F05D 2250/21; F05D 2250/23; F05D 2300/6033; F01D 5/282; F01D 5/284; F01D 5/288; F01D 25/007; Y02T 50/60

USPC ................ 428/156, 167, 172, 192, 212, 213
See application file for complete search history.

(56) References Cited

U.S. PATENT DOCUMENTS

| 8,439,639 B2 | 5/2013 | Joe et al. |
| 9,708,929 B2 | 7/2017 | Swedowicz et al. |
| 10,399,911 B2 | 9/2019 | Shim et al. |
| 10,801,353 B2 | 10/2020 | Lutjen et al. |

(Continued)

FOREIGN PATENT DOCUMENTS

| CN | 111424242 B | 7/2020 |
| CN | 112126889 A | 12/2020 |

(Continued)

OTHER PUBLICATIONS

U.S. Appl. No. 17/646,508, filed Dec. 30, 2021, by Blair et al.

*Primary Examiner* — Megha M Gaitonde
(74) *Attorney, Agent, or Firm* — Shumaker & Sieffert, P.A.

(57) ABSTRACT

In some examples, article used as a component for a turbine engine that operates in a high temperature environment. The article may include: a ceramic or ceramic matrix composite (CMC) substrate; and a coating on the ceramic or the CMC substrate, wherein the coating defines an outer surface of the article. The coating includes a plurality of surface features defining channels on the outer surface of the article. The channels are configured to modify a flow of molten Calcia-Magnesia-Alumina Silicate (CMAS) over the outer surface of the coating in a gas flow over the outer surface of the article to reduce accumulation of the molten CMAS on the outer surface of the article.

20 Claims, 7 Drawing Sheets

(56) References Cited

U.S. PATENT DOCUMENTS

| | | |
|---|---|---|
| 10,934,220 B2 | 3/2021 | Mikalsen et al. |
| 2004/0115471 A1 | 6/2004 | Nagaraj et al. |
| 2016/0362989 A1* | 12/2016 | Subramanian ............ C23C 4/12 |
| 2016/0369637 A1 | 12/2016 | Subramanian et al. |
| 2018/0282851 A1 | 10/2018 | Ndamka et al. |
| 2018/0363553 A1 | 12/2018 | Durham et al. |
| 2022/0025523 A1 | 1/2022 | Tolpygo et al. |

FOREIGN PATENT DOCUMENTS

| | | |
|---|---|---|
| JP | 6767248 B2 | 8/2015 |
| WO | 2011085376 A1 | 7/2011 |

* cited by examiner

ARTICLE WITH SURFACE STRUCTURES FOR CMAS RESISTANCE

TECHNICAL FIELD

The present disclosure relates to high temperature components such as components of gas turbine engine that operate in high temperature environments.

BACKGROUND

The components of gas turbine engines operate in severe environments. For example, some components exposed to hot gases in commercial aeronautical engines may experience surface temperatures in excess of about 1200° C. At these extreme temperatures, component substrates may be exposed to environmental species such molten Calcium-Magnesium-Alumino-Silicate (CMAS) containing materials, which can cause chemical and/or mechanical damage to parts. Improving component resistance to molten CMAS has involved a focus on coating chemistry such as, for example, development of environmental barrier coatings (EBCs). Engine components may be coated with one or more barrier layers to provide protection against thermal flux, erosion, and/or environmental contamination, for example, by reducing or preventing CMAS formation, migration, or infiltration.

SUMMARY

In some examples, the disclosure is directed to an article comprising: a ceramic or ceramic matrix composite (CMC) substrate; and a coating on the ceramic or the CMC substrate, wherein the coating defines an outer surface of the article, wherein the coating includes a plurality of surface features defining channels on the outer surface of the article, wherein the channels are configured to modify a flow of molten Calcia-Magnesia-Alumina Silicate (CMAS) over the outer surface of the coating in a gas flow over the outer surface of the article to reduce accumulation of the molten CMAS on the outer surface of the article.

In some examples, the disclosure is directed to a method comprising forming a coating on a ceramic or ceramic matrix composite (CMC) substrate, wherein the coating defines an outer surface of the article, wherein the coating includes a plurality of surface features defining channels on the outer surface of the article, wherein the channels are configured to modify a flow of molten Calcia-Magnesia-Alumina Silicate (CMAS) over the outer surface of the coating in a gas flow over the outer surface of the article to reduce accumulation of the molten CMAS on the outer surface of the article.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols in the drawings indicate like elements.

DETAILED DESCRIPTION

Figure 1:
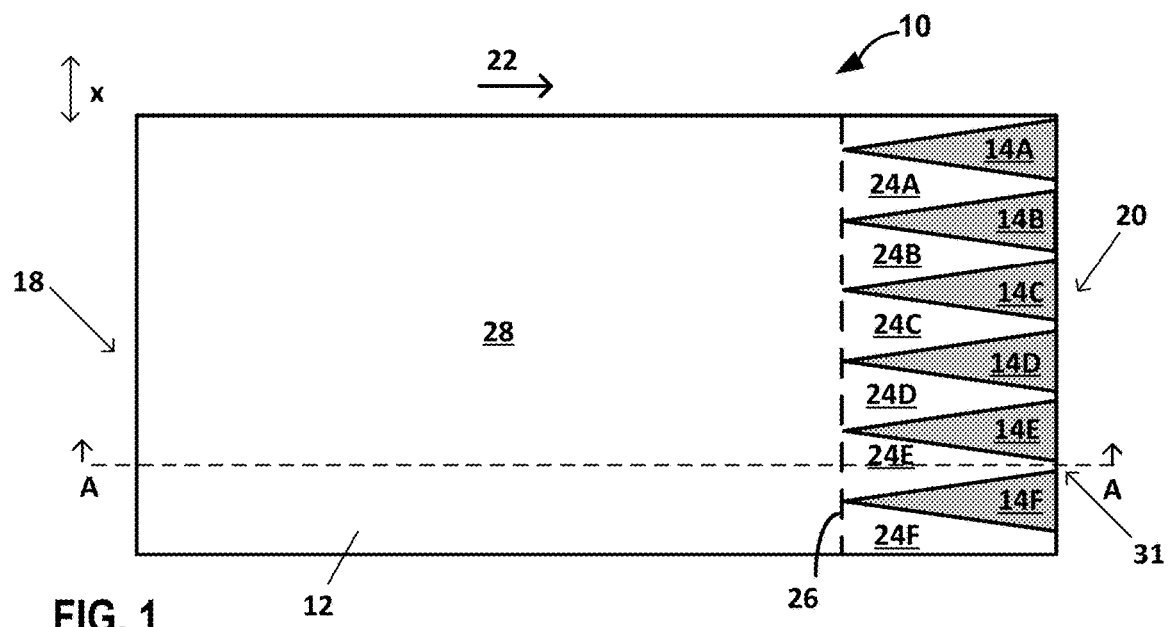
FIG. 1 is a conceptual schematic diagram illustrating a top view of an example article including a plurality of surface features in accordance with some examples of the disclosure.

In some examples, the disclosure relates to articles that may be employed as components in high temperature mechanical systems, such as gas turbine engines, and techniques for making and using the same. In gas turbine engines, increasing demands for greater operating efficiency (e.g., fuel efficiency) has led to the operation of gas turbine engines at higher temperatures. Ceramic matrix composite (CMC) components are making their way into gas turbine engines due to their potential for higher operating temperature relative to other materials. However, CMC components in gas turbine engines are also susceptible to damage from CMAS, and the higher operating temperatures at which CMCs operate the potential damage from CMAS can shorten component life or cause catastrophic failure of a part. Since CMAS melts at the higher operating temperatures of CMC components, the molten CMAS can react more readily with protective environmental coating layers, which has constrained operating temperatures or required layered coatings to resist or delay the chemical or mechanical damage CMAS causes coatings and parts. Given sufficient time in contact with a coating in a specific region of a turbine engine, the molten CMAS can infiltrate and/or react with the CMC coating. However, as described below with regard to FIGS. 9-12, for example, there may be time to remove molten CMAS from the surface of a coated CMC before the CMAS completely reacts with a CMC component.

Examples of the present disclosure include articles that incorporate structure onto gas washed outer surfaces to promote the removal of CMAS from their surface. In some examples, the articles may include a ceramic or CMC substrate having a coating such as an environmental barrier coating and/or abradable coating defining the outer surface of the component. The surface of the coating may include one or more protruding surface features and/or channels that promote the flow of a molten material such as molten CMAS within a gas stream downstream, e.g., so that the molten CMAS is transferred downstream of the component rather than pooling or otherwise gathering on the surface of the component. Such structures may decrease CMAS exposure in the hottest portions of a gas turbine engine, pushing the CMAS downstream (and possibly beneficially atomizing the fluid) to lower temperature areas where the CMAS solidifies or may be more easily managed as lower temperatures slow reaction rates. The structures may reduce accumulation of molten materials on critical components and reduce stresses during freeze/thaw cycles, which may lead to longer component life.

In some examples, the surface structures (e.g., in the form of protrusions or recessed channels), for example, may be positioned on a surface of an article at the downstream edge of a gas path, upstream of rub path on a seal segment, or distributed along a gas flow surface, or the like. In some examples, the surface structures may consist of rising and/or narrowing channels that function to draw molten materials (e.g., molten CMAS) up the channels by surface tension and capillary action which will increase gas flow drag on the molten material, pushing it further up to a channel convergence with a sharp back lip that promotes the liberation of molten droplets from the part surface. In some examples, molten materials may be atomized and expelled from a high-temperature mechanical system by the flow of gases across the substrate surface. In some examples, the surface structures are a plurality of channels and/or protrusions, the plurality of channels/protrusions may run parallel to the gas flow but not necessarily perpendicular to a component edge.

Different configurations may allow or benefit from machining the structures into a part surface. In some examples, the structures may be channels which are recessed into a surface coating. The recessed channels may be cooler and less susceptible to erosion, which may reduce thermal stresses in the substrate. Additionally, recessed channels may function collect molten materials, drawing liquid along the channel length by surface tension and capillary action. Protruding surface features and/or channels rising above the surface plane of a coating may be at higher temperatures which may decrease CMAS viscosity to aid its flow/removal from an article.

The geometry of the surface structures may depend on a number of factors. Surface chemistry of the part, manufacturability, and performance detriment of flow disrupting surface features may be some considerations in selecting the geometry of the plurality of surface structures. In some examples, a plurality of surface structures may be machined into a coated component, additively manufactured, mask and coated, or the like.

In some examples, an article has a surface which is made up of a composite coating on a substrate, where the composite coating is predominantly resistant to molten materials (e.g., CMAS), but incorporates regions of higher susceptibility to molten materials. The susceptible regions may over time be infiltrated and/or react with molten CMAS and removed via spallation and/or dissolved/melted into the CMAS, generating a plurality of surface features (e.g., plurality of channels). In other words, an aspect of the disclosure contemplates a coating having a portion that is designed to be highly susceptible to CMAS attack and another portion that defines plurality of surface structures configured to promote the removal of molten materials along the surface of the substrate when the susceptible portions are removed. Regions of the surface with a coating susceptible to attack (e.g., infiltration of molten materials, reaction, or the like) may react with molten materials, causing spallation of the susceptible coating regions, forming a plurality of surface structures (e.g., a plurality of channels) on the surface. This approach may be particularly useful with an inset plurality of surface features configuration. The susceptible coating may be added in a second coating step to fill in machined or masked channels or joined or manufactured in another way. A coating susceptible to CMAS attack may be more porous than a non-susceptible or CMAS resistant coating region. In some examples, polyester may be included in a thermal spray formulation to create coating regions susceptible to CMAS attack. Alone or in combination, one or more of the following materials may be useful to create a coating that is susceptible to attack by molten materials: MgO, MgAlO, HfSiO, Mo, $MoSi_2$, SiAlON, $Al_2O_3$. Conversely, alone or in combination, one or more of the following materials may be useful to create a coating that is non-susceptible to attack by molten materials: GdZrO, YbDS, YbMS, other rare earth silicates, or other refractory materials.

In some examples, the plurality of surface features may function to decrease exposure of the surface to molten materials in the hottest portion of mechanical system, aiding the flow of molten materials downstream (and possibly atomizing molten materials which could be beneficial) to lower temperature areas of a mechanical system where the molten materials CMAS solidifies or can be more easily managed as lower temperatures slow reaction rates.

Figure 2A:
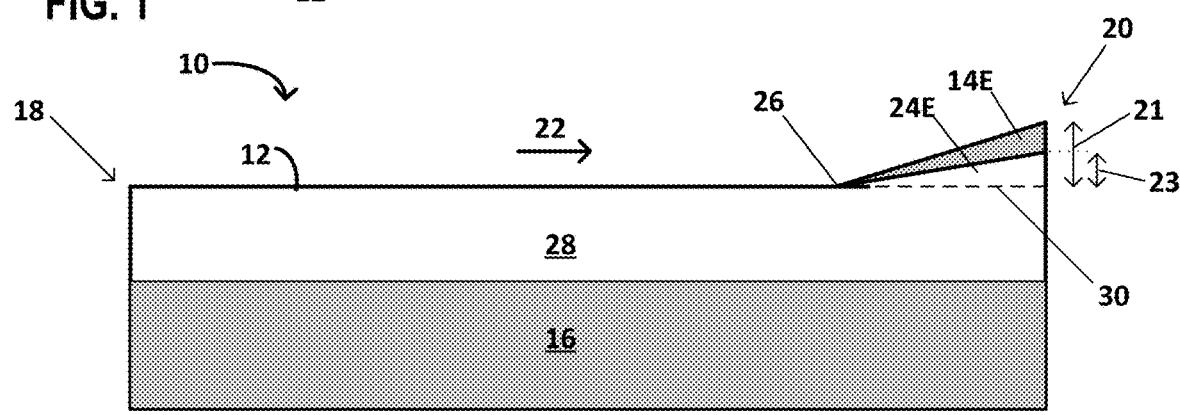
FIG. 2A is a conceptual schematic diagram illustrating an example side view of the example article of FIG. 1, in accordance with some examples of the present disclosure.
Figure 2B:
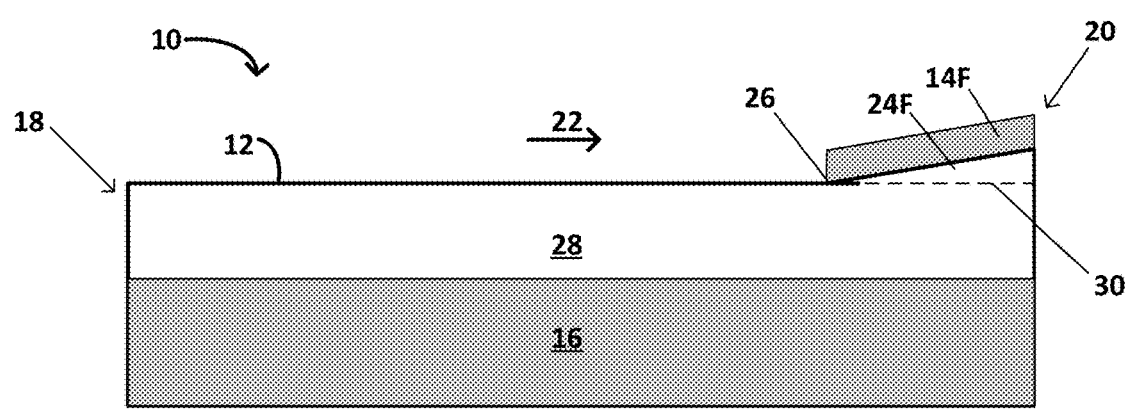
FIG. 2B is a conceptual schematic diagram illustrating alternative example side view of the example article of FIG. 1, in accordance with some examples of the present disclosure.
Figure 2C:
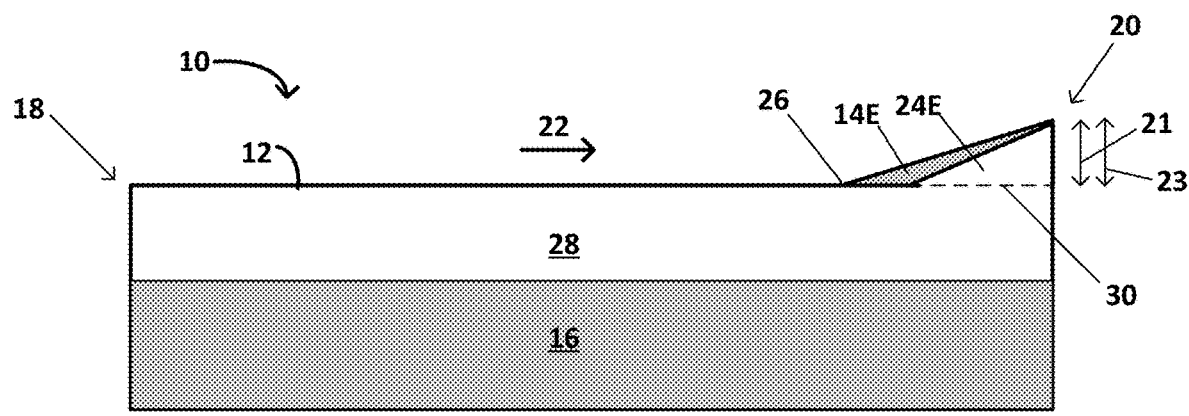
FIG. 2C is a conceptual schematic diagram illustrating alternative example side view of the example article of FIG. 1, in accordance with some examples of the present disclosure.

FIG. 1 is a conceptual schematic diagram illustrating the top view of example article 10 defining outer surface 12 (also referred to as "surface 12"). FIG. 2A is a conceptual schematic diagram illustrating an example view of article 10 along cross-section A-A. FIG. 2B is a conceptual schematic diagram illustrating an alternative example view of article 10 along cross-section A-A. FIG. 2C is a conceptual schematic diagram illustrating an alternative example view of article 10 along cross-section A-A.

As will be described below, surface 12 of includes a plurality of surface features 14A-14F (collectively surface features 14) which define plurality of channels such as channels 24A-24F (collectively channels 24). Channels 24 may modify a flow of a liquid such as molten CMAS over the outer surface 12 of the coating 28, where a gas flows in direction 22 over outer surface 12 of article 10, e.g., to reduce accumulation of the liquid on outer surface 12 of article 10. For ease of description, examples of the present disclosure are described with regard to a liquid on outer surface 12 in the form of liquid CMAS although examples of the disclosure may be employed to modify the flow of other liquids over the surface 12 of article 10.

Article 10 may be a high-temperature component, for example, an industrial, automotive, or aeronautical component. In some examples, article 10 may be a component of a high-temperature mechanical system, such as, for example, a gas turbine engine or the like. In some examples, article 10 may form a portion of a flow path structure, a seal segment, a blade track, blade shroud, an airfoil, a blade, a vane, a combustion chamber liner, or another portion of a gas turbine engine article 10. While the description herein may be directed to a gas turbine component, it will be understood that the disclosure is not limited to such examples. Rather, plurality of surface features 14 may be included on a surface of any article which requires or may benefit form management of a molten materials flowing over an outer surface of the component. For example, plurality of surface features 14 may be included on a surface of an internal combustion engine, an industrial pump, a housing or internal seal ring of an air compressor, or an electric power turbine. In some examples, as shown, article 10 may have a simple geometric shape. In other examples, article 10 may have a more complicated geometry.

Article 10 includes substrate 16 and coating 28 on substrate 16. Substrate 12 may include a material suitable for use in a high-temperature environment. In some examples, substrate 12 may include a ceramic or a ceramic matrix composite (CMC) substrate. Suitable ceramic materials, may include, for example, a silicon-containing ceramic, such as silica ($SiO_2$) and/or silicon carbide (SiC); silicon nitride ($Si_3N_4$); alumina ($Al_2O_3$); an aluminosilicate; a transition metal carbide (e.g., WC, $Mo_2C$, TiC); a silicide (e.g., $MoSi_2$, $NbSi_2$, $TiSi_2$); combinations thereof; or the like. In some examples in which substrate 12 includes a ceramic, the ceramic may be substantially homogeneous. In some examples, substrate 12 may be a reaction bonded silicon carbide (RBSiC) substrate.

In examples in which substrate 12 includes a CMC, substrate 22 may include a matrix material and a reinforcement material. The matrix material may include, for example, silicon metal or a ceramic material, such as silicon carbide (SiC), silicon nitride ($Si_3N_4$), an aluminosilicate, silica ($SiO_2$), a transition metal carbide or silicide (e.g., WC, $Mo_2C$, TiC, $MoSi_2$, $NbSi_2$, $TiSi_2$), or another ceramic material. The CMC may further include a continuous or discontinuous reinforcement material. For example, the reinforcement material may include discontinuous whiskers, platelets, fibers, or particulates. Additionally, or alternatively, the reinforcement material may include a continuous monofilament or multifilament two-dimensional or three-dimensional weave, braid, fabric, or the like. In some examples, the reinforcement material may include carbon (C), silicon carbide (SiC), silicon nitride ($Si_3N_4$), an aluminosilicate, silica ($SiO_2$), a transition metal carbide or silicide (e.g., WC, $Mo_2C$, TiC, $MoSi_2$, $NbSi_2$, $TiSi_2$), or the like.

Substrate 12 may be manufactured using one or more techniques including, for example, chemical vapor deposition (CVD), chemical vapor infiltration (CVI), polymer impregnation and pyrolysis (PIP), slurry infiltration, melt infiltration (MI), combinations thereof, or other techniques.

Coating 28 may be an environmental barrier coating (EBC). When coating is in the form of an EBC, coating 28 may include at least one of a rare-earth oxide, a rare-earth silicate, an aluminosilicate, or an alkaline earth aluminosilicate. For example, coating 28 may include mullite, barium strontium aluminosilicate (BSAS), barium aluminosilicate (BAS), or strontium aluminosilicate (SAS). In some examples, coating 28 may include at least one rare-earth oxide, at least one rare-earth monosilicate ($RE_2SiO_5$, where RE is a rare-earth element), at least one rare-earth disilicate ($RE_2Si_2O_7$, where RE is a rare-earth element), or combinations thereof. The rare-earth element in the at least one rare-earth oxide, the at least one rare-earth monosilicate, or the at least one rare-earth disilicate may include at least one of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc). Coating 28 may also protect substrate 12 and provide for other functions besides that of environmental protection, e.g., by functioning as a thermal barrier coating (TBC), abradable coating, erosion resistant coating, and/or the like.

When coating 28 functions as a TBC, coating 28 may provide thermal cycling resistance, a low thermal conductivity, erosion resistance, combinations thereof, or the like. In some examples, coating 28 may include zirconia or hafnia stabilized with one or more metal oxides, such as one or more rare earth oxides, alumina, silica, titania, alkali metal oxides, alkali earth metal oxides, or the like. For example, coating 28 may include yttria-stabilized zirconia ($ZrO_2$) or yttria-stabilized hafnia, or zirconia or hafnia mixed with an oxide of one or more of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc).

As one example, coating 28 may include a rare earth oxide-stabilized zirconia or hafnia layer including a base oxide of zirconia or hafnia and at least one rare-earth oxide, such as, for example, at least one oxide of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc). In some such examples, coating 28 may include predominately (e.g., the main component or a majority) the base oxide including zirconia or hafnia mixed with a minority amount of the at least one rare-earth oxide.

Although not shown in FIGS. 2A-2C, article 10 may include one or more optional coatings/layers present between coating 28 and substrate 16, e.g., in the form of a bond layer (e.g., a silicon-based bond coat) and/or intermediate layer.

Surface 12 of coating 28 may be a gas-washed surface of article 10 with gas flowing in direction 22 during operation of article 10 as a component in a gas turbine engine. In some examples, such as when article 10 is a part of a high temperature mechanical system such as a gas turbine engine, gases flowing over the surface 12 may be hot gases which can melt materials such as CMAS, rendering molten CMAS on surface 12. As described herein, if allowed to remain in contact with surface 12 (e.g., by pooling or otherwise accumulating on surface 12), molten CMAS may infiltrate and react with substrate 16, causing mechanical and/or chemical damage.

Article 10 may be employed with a gas turbine system to define leading edge 18 and trailing edge 20 relative to gases flowing in the direction of arrow 22 through the system. Leading edge 18 may be the point of article 10 that is furthest upstream along the gas-washed flow path, and trailing edge 20 may be the point of article 10 that is furthest downstream along the gas-washed flow path. A gas-washed flow path may thus be defined as the portion of surface 12 between leading edge 18 and trailing edge 20. In some examples, leading edge 18 and trailing edge 20 may be a component edge.

In accordance with some examples of the disclosure, article 10 includes plurality of surface features 14A-14F. In the example of FIGS. 1-2C, surface features 14 of article 10 are in the form of respective protrusions that protrude from surface plane 30 of coating 28. Surface features 14 are positioned adjacent to trailing edge 20 with the protrusion beginning at position 26 of article 10 and extending downstream to trailing edge 20. Protruding surface features 14 protrude to height 21 above surface plane 30 at trailing edge 20. As shown in FIG. 2A, in some examples, protruding surface features 14 may gradually ramp up and away from surface plane 30 while extending in the downstream direction from position 26 to trailing edge 20. Additionally, or alternatively, one or more of protruding surface features 14 may protrude relatively abruptly at position 26 (e.g., in a stepwise fashion), as shown in FIG. 2B, and may gradually ramp away from surface plane 30 moving in the downstream direction towards trailing edge 20.

Plurality of channels 24A-24F are defined between protruding surface features 14. Channels 14 may be recessed relative to protruding surface features 14 (e.g., as shown in FIGS. 2A-2C for channel 24E formed between the vertically extending walls of protruding surface features 14E and 14F). In some examples, the bottom surface of channels 14 may be substantially even with surface plane 30. In some examples, such as that shown in FIGS. 2A-2C, channels 14 may ramp up from surface plane 30 moving downstream, e.g., to height 23 in FIG. 2A.

The angular nature of protruding surface features 14 results in the width of channels 24 being tapered, e.g., in direction 22. In the examples of FIGS. 1-2C, channels 14 taper such that the width along the x-direction indicated in FIG. 1 narrows moving in the downstream direction. In such a configuration, the inlet openings of respective channels 14 at position 26 have a greater width than the outlet openings adjacent to trailing edge 20 (e.g., at outlet opening 31 for channel 24E.

Protruding surface features 14 and channels 24 may function to modify the flow of molten materials over surface 12 of coating 28 in direction 22, e.g., in the presence of a gas flow during operation of article 10 as a component in a gas turbine engine that operates in a high temperature environment. For example, the rising and/or narrowing nature of channels 14 may function to draw molten CMAS up channels 14 by surface tension and/or capillary action which will increase gas flow drag on the fluid/liquid CMAS pushing the CMAS further up to a channel convergence (e.g., outlet opening 31) with a sharp back lip at trailing edge 20 that promotes the liberation of molten droplets from surface 12 of article 10. In some examples, the incline/ramp of channels 24 and/or protruding features 14 may assist in wicking molten CMAS to better transporting molten CMAS to cooler zone of the engine downstream of article 10 and/or atomize and exhaust material by increasing fluid drag on molten CMAS in a channel 24. For instance, molten material at the top of the ramp of channel 24E at outlet opening 31 at trailing edge 20 may be exposed to high velocity gases flowing along the gas path, which may atomize molten material. Moreover, channels protruding (e.g., in a ramping fashion) from surface plane 30 may be at higher temperatures during operation of a gas turbine engine, which may decrease molten CMAS viscosity to aid its flow/removal from article 10 downstream of trailing edge 20. Accordingly, surface features 14 and channels 24 on the gas washed surface of article 10 may promote the removal of molten CMAS from surface 12.

Channels 24 and protruding surface features 14 may have any suitable shapes and dimensions. In some examples, it may be desirable for protruding surface features 14 to have height 21 that is relatively small to prevent huge protrusion into the gas stream over surface 12 but still enough to function as described herein. In some examples, height 21 may be approximately equal to the max depth at which CMAS may accumulate or pool on surface 12 absent protrusions 14 and channels 24. In some examples, height 21 may be up to about 2 millimeters (mm) such as greater than zero to 2 mm. Height 23 may be equal to or greater than about 20 microns, such as at least about 100 microns, at least about 120 microns, or up to 2 millimeters, such as height 23 being about zero, greater than zero and/or less than or equal to 2 mm. Height 23 of channels 24 may be such that the difference between height 21 and height 23 is approximately 100 microns or less, such as from 100 microns to zero (e.g., where height 21 is equal to height 23). The shape/dimensions of individual channels 24 may vary between channels or may be substantially the same for all channels. The shape/dimensions of individual protruding surface features 14 may vary between respective protruding surface features or may be substantially the same for all protruding surface features 14.

FIG. 2C illustrates an example cross-section of article 10 along A-A where height 21 of protrusion 14E is approximately equal to height 23 of channel 24E. In some an example, the ramp of channel 24 from the surface plane 30 starts downstream of location 26 where the ramp up of protruding surface feature 14E begins. In such an example, the angle of the ramp up for channel 24E is greater than the ramp angle of channel 14E, where the apex of channel 24E and the apex of protruding surface feature 14E are equal to each other, e.g., directly adjacent to trailing edge 20.

The inlet width (in the x-direction of FIG. 1) of respective channels 24 at the most upstream position as defined by the starting of protruding surface features 14, e.g., at location 26 in FIG. 1, may be any suitable value. In some examples, the inlet width may be fairly wide and dependent on the overall dimensions of article 10. In some examples, the inlet width may be at least about 0.5 millimeters, such as about 0.5 mm to about 5 mm. The outlet width of the respective channels 24 (e.g., the width of channels 24 further downstream) may be less than the inlet width. In some examples, the outlet width (e.g., directly adjacent to trailing edge 20) may be about 100 microns to about 1 mm. In some examples, channels 24 converge to a zero width at the outlet, e.g., where height 23 and height 21 are approximately equal.

The length of channels 24 and protruding surface features 14 (in the gas flow direction 22) may be dependent on the overall length of article 10. Channels 24 and protruding surface features 14 may be located on article 10 to coincide/overlap with an area on surface 12 that would otherwise be susceptible to CMAS attack (e.g., from CMAS pooling). For example, location 26 on article 10 may be just upstream of a location on surface 12 of article 10 that would otherwise be susceptible to CMAS attack. Channels 24 and protruding surface features 14 may extend over the entire area that is susceptible to CMAS attack, e.g., to help prevent accumulation of CMAS in that area by assisting the flow of molten CMAS downstream from location 26 beyond the furthest downstream portions of channels 24 and protruding surface features 14. In one example where the length of surface 12 that would be susceptible to CMAS attack may be about 1 cm, protruding surface features 14 and/or channels 24 may be greater than 1 cm, such as 2 cm, and may overlap with the 1 cm portion on surface 12, e.g., where the "mouth" of channels 24 are at the area susceptible to CMAS attack.

While channels 24 and protruding surface features 14 are shown extending from a position down stream of leading edge 18 of article 10, starting at position 26 upstream of trailing edge 20, channels 24 and protruding surface features 14 may be positioned at any suitable location on surface 12, e.g., in the area of article 10 where coating 28 is most susceptible to CMAS attack. In some examples, channels 24 and protruding surface features 14 end prior to trailing edge 20. In some examples, rather than a single "row" of channels 24 and protruding surface features 14, article 10 may include multiple "rows" arranged one after another in the gas flow direction 22, e.g., where the size of article 10 in flow direction 22 allows for multiple rows.

The examples of FIGS. 1 to 2C include surface features that protrude from the surface plane of a coating to define channels that at or above the surface plane of the coating. In other examples, a coating may include surface features in the form of a plurality of channels which are recessed into surface of a coating.

Figure 3:
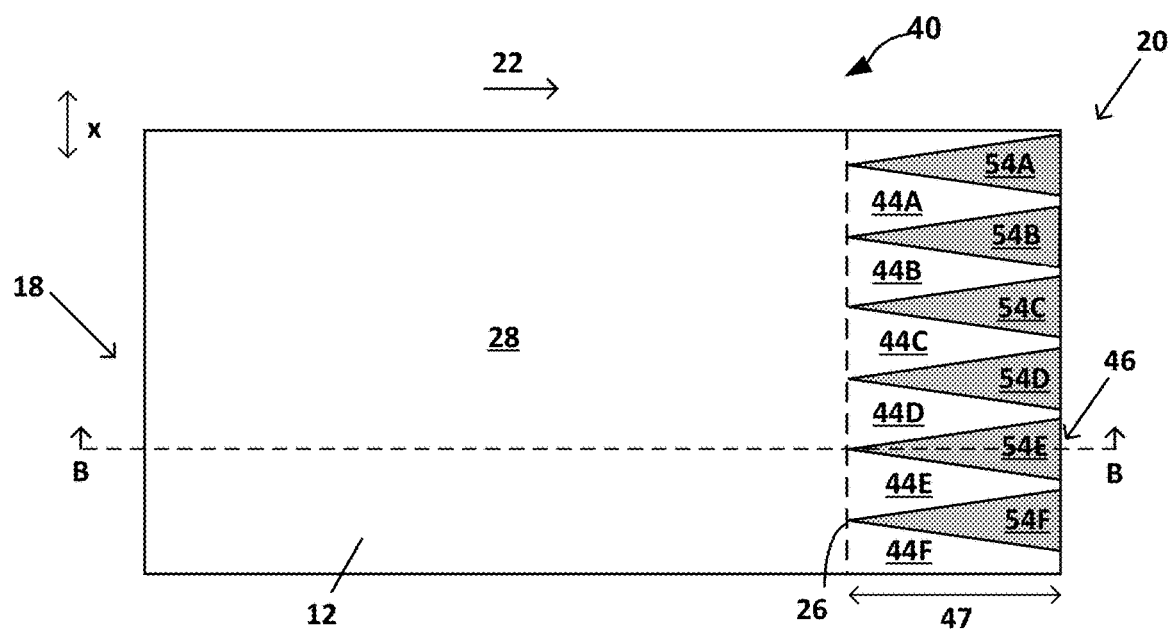
FIG. 3 is a conceptual schematic diagram illustrating a top view of another example article including a plurality of surface features in accordance with some examples of the disclosure.
Figure 4:
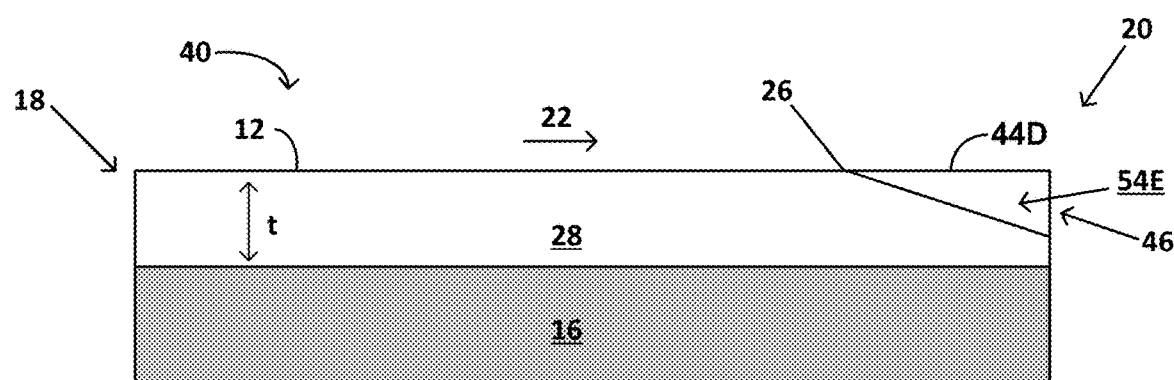
FIG. 4 is a conceptual schematic diagram illustrating an example side view of the example article of FIG. 3, in accordance with some examples of the present disclosure.

FIGS. 3 and 4 are conceptual diagrams illustrating such an example. FIG. 3 is a conceptual diagram illustrating the top view of an example article 40 including coating 28 on substrate 16. FIG. 4 is the conceptual diagram illustrating the example article 40 of FIG. 3 along cross section B-B. Article 40 and article 10 may be similar to each other and like features are similarly numbered. For example, coating 28 and substrate 16 of article 40 may be substantially the same as coating 28 and substrate 16 of article 10 in FIGS. 1-2C.

However, unlike example article 10, coating 28 includes a plurality of channels 54A-54F (collectively "channels 54") recessed into outer surface 12 of coating 28. In the example of FIGS. 3 and 4, channels 54A-54F are defined in part by surface features 44A-44F, where the recessed nature of channels 54 results in surface feature 44A-44F extending away (e.g., in a finger-like fashion) from position 26 on surface 12 of coating 28 with a height that is approximately along the same plane as the plane of surface 12. In other examples, surface features 44 may protrude from the plane of surface 12 of coating 12 (e.g., similar to that of features 14 of article 10) in combination with channels 54 being recessed into surface 12.

In the illustrated example of article 40, channels 54 have a ramped configuration (e.g., as illustrated in FIG. 4 for channel 54E) in direction 22 where the depth of recess into coating increases moving from position 26 to trailing edge 20. The vertical walls of recessed channels 54 define the perimeters of surface features 44A-44F. In the example of FIGS. 3 and 4, the ramp down for recessed channels 54 may start at the plane of surface 12 at position 26 and gradually ramp down in a linear manner. In other examples, the ramp may be in a stepwise fashion, e.g., with a single stepwise drop into surface 12 at position 12, and a bottom surface of channels 54 that extends substantially co-planar with the plane of surface 12 or with a ramp to further increase the depth of recess into plane of surface 12.

The width along the x-axis shown in FIG. 3 of channels 54 may taper moving in the downstream direction. In the example article 40 of FIGS. 3 and 4, the taper is such that the width increases moving from position 26 to trailing edge 20. Channels 54 each define an outlet opening at trailing edge 20, such as outlet opening 46 for channel 54E.

Channels 54 may have any suitable dimensions and shape, e.g., that allows channels 54 to function as described herein. In some examples, channels 54 may be the inverse dimensions of channels 24 described above (e.g., with the height 23 for channels 24 being the max depth of channels 54, and the inlet width and outlet widths of channels 24 being the widest and narrowest width, respectively, of channels 54). In some examples, channels 54 may have a depth into surface 12 that is greater than zero but less than the thickness t of coating 28 as labelled in FIG. 4. In some examples, thickness t of coating 28 may be about 100 microns to about 2 mm. In some example, channels 54 are recessed to a maximum depth of about 50% of the thickness t of coating 28.

As described herein, recessed channels 54 may be inset into surface 12 of coating 28. The recessed nature of channels 54 may be desirable because recessed portion may be relatively cooler and less susceptible to erosion. Additionally, thermal stresses may be reduced by recessed channels 54. Although the volume defined by recessed channels 54 may be below the plane of surface 12 upstream of position 26 and less influenced by the flow of gas along direction 22, the narrowed and tapered nature of channels 54 at position 26 may function to provide a capillary pull on liquid CMAS entering channels 54 towards trailing edge 20. Moreover, the length 47 of channels 54 may be great enough to still allow for the flow of gas along direction 22 over surface 12 to force a liquid in channels 54 along direction 22 and out of channels at trailing edge 20 (e.g., out of outlet opening 46). As such, recessed channels 54 may modify the flow of molten CMAS over surface 12, e.g., to promote the removal of the CMAS from article 40 in a downstream direction beyond trailing edge 20.

As describe herein, channels 24 and channels 54 may be defined by a pair of corresponding vertical walls either protruding from surface 12 (as in the case of channels 24) or recessed into surface 12 (as in the case of channels 54). The vertical walls of the channels as well as the bottom surface of the channels may define flow path for molten materials (CMAS) to flow along in direction 22, e.g., starting at position 26 on surface 12. As described herein, in some examples, the width (along x-axis labelled in FIG. 1) of channels 24 and channels 54 may be tapered in flow direction 22. For example, as shown in FIG. 1, channel 24E narrows from position 26 to a convergence at outlet opening 31, with channel 24E being widest at position 26 and narrowest downstream adjacent to trailing edge 31. Conversely, channel 54E diverges/widens from position 26 to outlet opening 46, with channel 54E being narrowest at position 26 and widest downstream adjacent to trailing edge 20. In still other examples, channels 24 and 54 may have a uniform or nearly uniform width throughout. In some examples, each channel in the plurality of channels may have a geometry substantially similar to channels 24 or channels 54 although other geometries are contemplated. In some examples, a plurality of channels may combine with other surface features to form plurality of surface features 14 (e.g., other ramps, recesses, slots, or the like configured to manage molten materials on surface 12 of substrate 16).

In some examples, as shown, channels 24, 54 and surface features 14, 44 are positioned to extend from trailing edge 20 of articles 10, 40 at least partially upstream to position 26 nearer leading edge 18. Additionally, or alternatively, in some examples, plurality of surface features 14, 44 and/or channels 24, 54 may extend from adjacent to leading edge 18 at least partially across surface 12 toward trailing edge 20. In some examples, surface features 14, 44 and/or channels 24, 54 may extend across substantially all of surface 12 from leading edge 18 to trailing edge 20, or may be positioned at discrete locations along surface 12 of coating 28. Channels 24, 54 and surface features 14, 44 may be orientated with regard to direction 22 of gas flow during operation of a gas turbine engine system that includes articles 10, 40 as a component (e.g., as a turbine blade, vane, or shroud).

Figure 5:
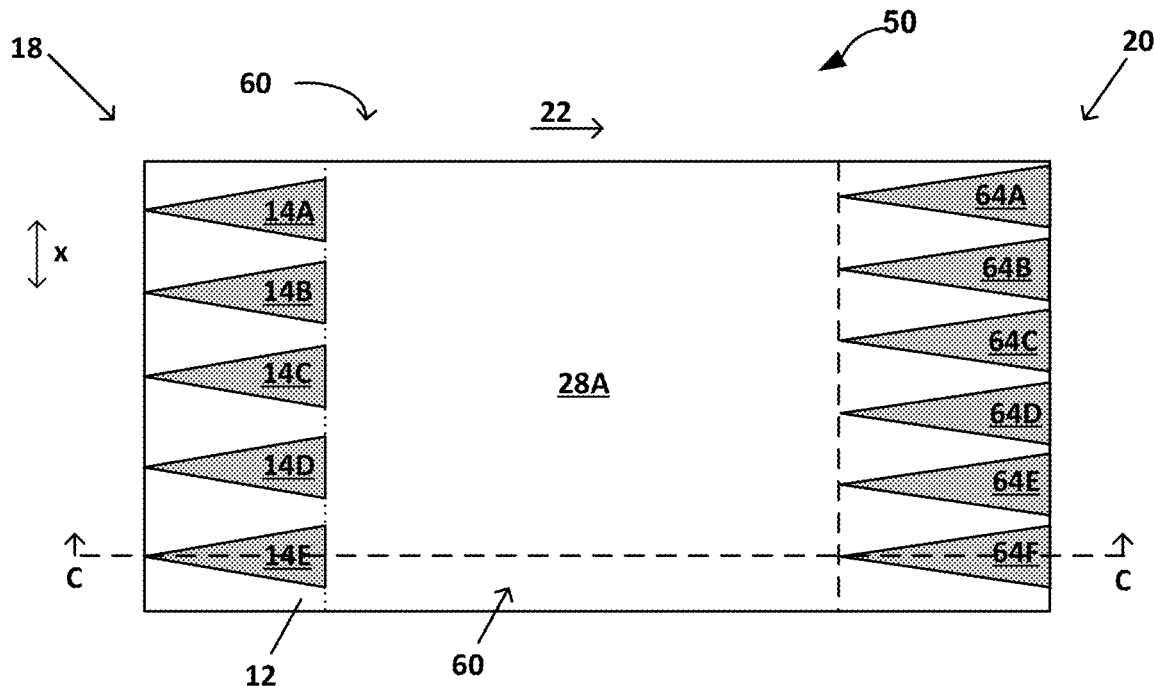
FIG. 5 is a conceptual schematic diagram illustrating a top view of another example article including a plurality of surface features in accordance with some examples of the disclosure.
Figure 6:
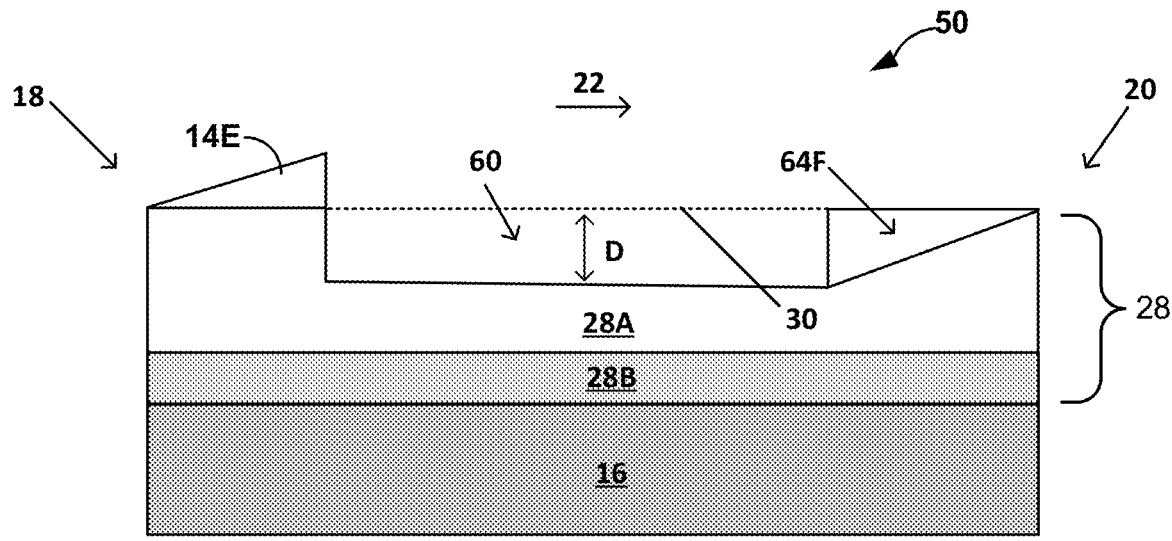
FIG. 6 is a conceptual schematic diagram illustrating an example side view of the example article of FIG. 5, in accordance with some examples of the present disclosure.

FIG. 5 is a conceptual diagram illustrating the top view of another example article 50 according to the present disclosure. FIG. 6 is a conceptual diagram illustrating example article 50 of FIG. 5 along cross-section C-C. Article 50 may be similar to articles 10 and 40 and like features are similarly numbered. For example, coating 28 and substrate 16 of article 50 may be substantially the same as coating 28 and substrate 16 of articles 10 and 40 in FIGS. 1-4.

In the example of FIGS. 5 and 6, coating 28 includes multiple layers; EBC layer 28B on substrate 16 and abradable layer 28A on EBC layer 28B. In other examples, layer 28B may be a TBC layer. Abradable layer 28A may have the same or substantially similar composition to that described herein for an EBC but with a greater porosity than, e.g., EBC layer 28B. However, abradable layer 28A may configured to be abraded by an opposing component during operation of a gas turbine engine with article 50 being incorporated as a component (e.g., as a blade track). For example, with article 50 forming a blade track, abradable layer 28A may be abraded by interaction with the tip of an opposing, rotating blade. The opposing blade tip may abrade into surface plane 30 along a path to cut track 60 into coating 28 to a depth D. In the example of FIGS. 5 and 6, the path of the opposing blade tip that forms track 60 may be in x-direction indicated in FIG. 5 (e.g., perpendicular to the flow direction 22). As illustrated by the dashed line, surface 12 of coating 28A may be a flat or substantially level surface as initially manufactured, but configured to be abraded during use, such as part of a seal segment of a gas turbine engine.

As shown in FIGS. 5 and 6, article 50 includes protruding surface features 14 positioned upstream of track 60, e.g., extending from directly adjacent of upstream edge 18 to directly adjacent to track 60. Although not labelled in FIGS. 5 and 6, like that in FIGS. 1-2C, neighboring protruding surface features 14 may define respective channels (such as channels 24) on surface 12 of coating 28. Protruding surface features 14 and its associated channels are oriented to the direction of gas flow 22.

The protruding surface features 14 and/or the channels may function to modify the flow of molten CMAS over surface 12, e.g., to promote the movement of the liquid CMAS over surface to downstream of trailing edge 20. For example, the channels defined by protruding surface features 14 are widest at the upstream end and narrows to a convergence at the opposing downstream end. Molten materials may collect and be fed into wider opening of the channels, with the upstream end of the channels acting as a channel mouth. Molten materials in the channel may wick or otherwise flow towards the downstream end through surface tension and/or capillary action, pooling deeper as the channels narrows to a convergence at the end adjacent to track 60. Gas flow drag may increase as molten materials climb the incline of the channels because gas velocity may increase further away from surface 12. Thus, fluid drag from gases flowing over the surface of the channels may increase as molten materials travel along the channels, promoting liberation of molten materials from surface 12 of coating 28A. The protrusions and channels in FIGS. 5 and 6 may have the same shape and/or dimensions as described herein for channels 24 and protrusions 14 in FIGS. 1-2C.

As shown, article 50 also includes recessed channels 64A-64F (collectively "channels 64"). Channels 64 are located adjacent to the downstream edge of track 60 and are recessed into plane 30 of coating 28A to a max depth D approximately equal to the maximum cut depth of track 60. The depth of channels 64 ramp up from depth D moving towards trailing edge 64. In the example illustrated in FIG. 6, the ramp up in depth of channels 64 is such that the end of channels 64 at trailing edge 20 is approximately equal to (e.g., flush or nearly flush with) surface plane 30 of coating 28A. In other examples, channels 64 may ramp up to a height above surface plane 30 or to a depth still below surface plane 30 at a position nearest trailing edge 20. Channels 64 are oriented to the direction 22 of gas flow over surface 12. Channels 64 may function to provide a pathway for molten CMAS to be removed from the bottom of track 60 (e.g., from the bottom of a rubbed abradable seal segment).

Unlike that of recessed channels 54 in FIGS. 3 and 4, channels 64 are tapered to widen in width moving downstream along direction 22. This may allow molten CMAS within track 60 to collect within the wide mouth of channels 64 and then be drawn up the ramp and concentrated within channels 64 as channels 64 narrow in width moving downstream. In other examples, some or all of channels 64 are configured to taper in the opposite direction with the widest portion being downstream, e.g., adjacent to trailing edge 20. In other examples, some or all of channels 64 do not exhibit a tapering width in the downstream direction 22.

While the channels 64 are shown extending from track 60 to trailing edge 20, in other examples, channels 64 may not extend all the way to trailing edge 20. Likewise, while protruding surface features 14 are shown extending from leading edge 18 to track 60, in other examples, channels 64 may not extend all the way to leading edge 18 and/or to track 60.

Figure 7:
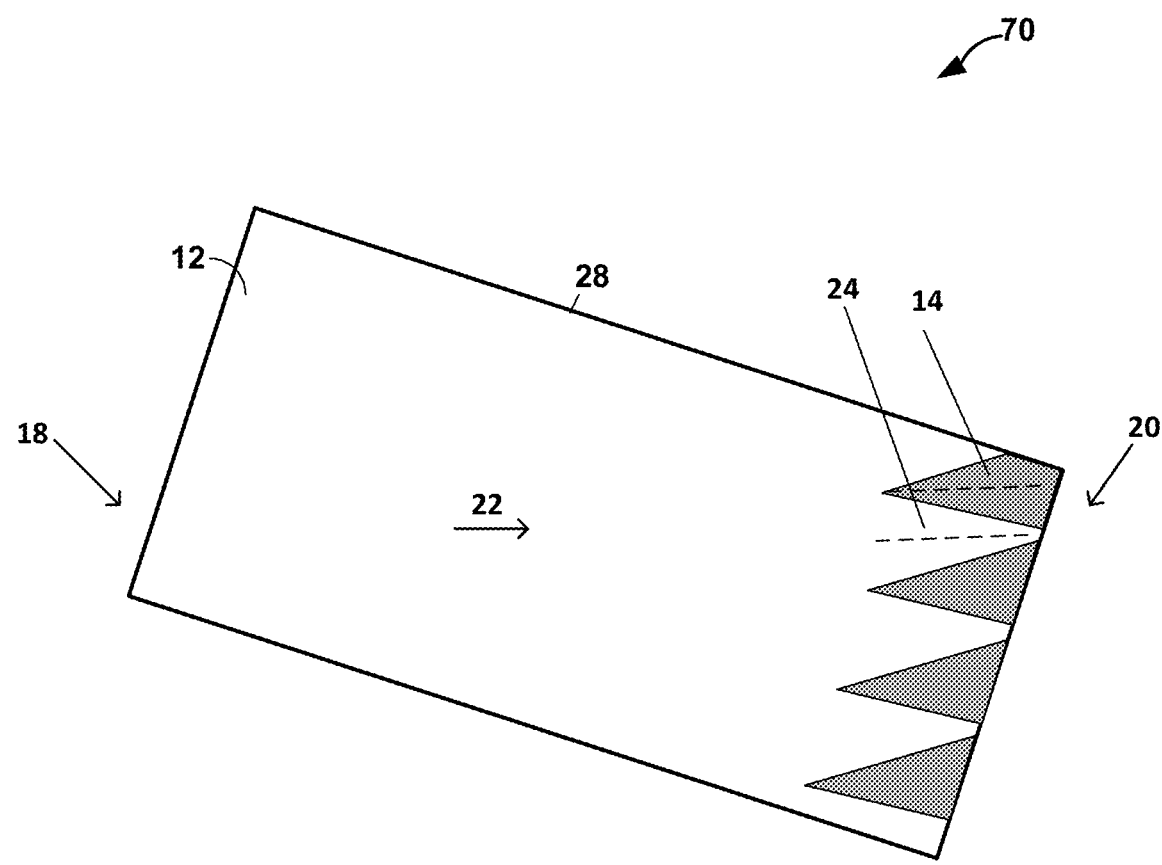
FIG. 7 is a conceptual schematic diagram illustrating a top view of another example article including a plurality of surface features in accordance with some examples of the disclosure.

In the examples of FIGS. 1-6, leading edge 18 and trailing edge 20 are both substantially perpendicular to gas flow direction 20. In such examples, the surface features and channels may extend in a direction substantially parallel to the gas flow direction and substantially perpendicular to leading edge 18 and/or trailing edge 20. FIG. 7 is conceptual diagram illustrating an example article 70 in which the leading edge 18 and trailing edge 20 are not perpendicular to direction 22 of the gas flow over surface 12 of coating 28. As shown in FIG. 7, in such as example, protruding surface features 14 and channels 24 may be orientated such that the central axis (indicated as a dashed line for each) extends in a direction substantially parallel to direction 22 of the gas flow and not perpendicular to trailing edge 20 or lead edge 18. Thus, in examples in which the gas flow path does not align with a trailing/leading edge of a component, it may be desirable to orient surface features 14 and/or channels 24 to be substantially parallel to the direction 22 of gas flow rather than with an edge of a component (e.g., a CMC gas turbine component) if the gas flow will not be perpendicular to the part edge, to promote removal of molten materials from surface 12 of a coating 28 in the manner described herein.

While the examples of FIGS. 1-7 are shown with article 10 have a rectangular shaped surface 12, examples are not limited to such surface shapes. In some examples, surface 12 of article 10 may increase or decrease in width, e.g., moving in the gas flow direction 22. In some examples, article 10 may have a trapezoidal surface shape with an increasing width in the gas flow direction 22, e.g., in the case of a turbine vane. Additionally, surface 12 is not limited to a flat surface plane. For examples, the surface of article 10 may have a curvilinear or non-planar profile, e.g., in the direction of gas flow 22.

Figure 8:
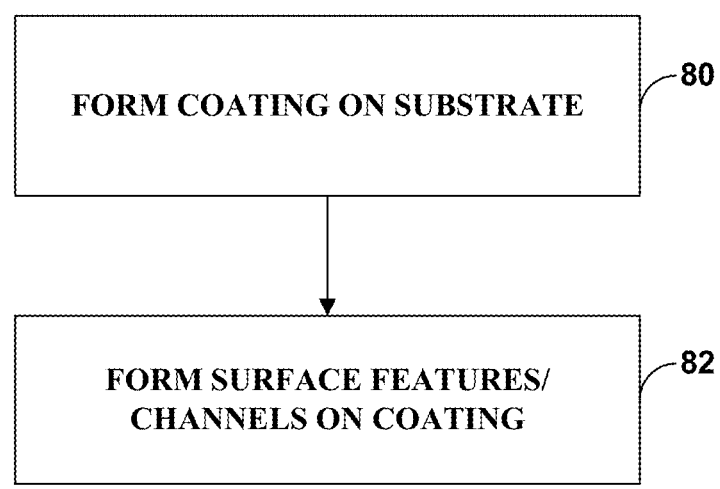
FIG. 8 is a flowchart illustrating an example technique for forming an article including a coating on a substrate, where the coating includes surface features in accordance with some examples of the present disclosure.

Any suitable techniques may be employed to form articles in accordance with the disclosure, such as articles 10, 40, 50, and 70 including the described surface features/channels. FIG. 8 is a flow diagram illustrating one example technique for manufacturing such an article, e.g., for use as a component in a gas turbine engine. The technique of FIG. 8 is described with reference to article 30 of FIGS. 3 and 4. However, a person having skill in the art will understand that the technique of FIG. 8 may be performed to manufacture another example article, such as articles 10, 50, and 70.

As shown, coating 28 may be formed on substrate 16 using any suitable technique (80). In some examples, coating 28 may be formed by a thermal spray process, a slurry deposition process, and/or additive manufacturing process. In the example of FIG. 8, as initially deposited, coating 28 may have a substantially planar surface 12.

Subsequently, channels 54 may be formed in coating 28 (82). Any suitable process may be employed such as a material removal process. In some examples, a machining process (or other suitable selective removal process) may be employed to selectively remove portions of coating 28 to form recessed channels 54. The removal of portions of coating 28 to form recessed channels 54 may also result in the formation of surface features 44 extending from position 26.

In other examples, in addition to, or as an alternative to formation of a coating and selective removal of the coating, other techniques may be employed including suitable additive manufacturing techniques and techniques that iteratively deposit portions of material with selective masking (e.g., to allow for selective build up and/or removal of material).

In one example, the example surface features and channels of articles 10, 40, 50, and 79 may be achieved by initially forming a coating on substrate 16 with portions of the coating more susceptible to failure and removal from coating 28 during the operating life of the component. For example, in the case of recessed channels 54 inset in coating 28 for article 40, rather than being open, channels 54 of article 40 may initially be filled with a coating material that is different from the remaining portions of coating 28 shown in FIGS. 3 and 4. The material that initially "fills" channels 54 may be more susceptible to CMAS attack compared to the remaining portions of coating 28. In such an example, during the operating life of article 40, the CMAS susceptible portions may be infiltrated or otherwise caused to fracture and be removed from coating 28. Upon remove, open channels 54 may be formed coating 28, which may function as described herein to promote removal of molten CMAS from article 40. In other example, in addition to, or as an alternative to CMAS attack, the susceptible portions of coating 40 may be more susceptible to erosion or other mechanism that causes those portions to be removed during the operating life of article 40 within a gas turbine engine.

As such, in some examples, coating 28 on article 40 may initially include first and second portions, where the first portion is more susceptible to removal (e.g., via CMAS attack) compared to the second portion. In some examples, the first portion may be more susceptible to CMAS attack based on the composition and/or microstructure of the first portion compared to the second coating. For example, the composition of first portion may include one or more of MgO, MgAlO, HfSiO, Mo, MoSi$_2$, SiAlON, or Al$_2$O$_3$. Conversely, the composition of second portion may include GdZrO; a RE silicate such as yttrium monosilicate or other RE monosilicate and/or yttrium disilicate; or other refractory metals. In some examples, the composition of first portion may be formed almost entirely of one or more of MgO, MgAlO, HfSiO, Mo, MoSi$_2$, SiAlON, or Al$_2$O$_3$, e.g., with the second portion containing less or none of the material that forms the first portion. In some examples, first an second portion are formed of GdZrO; a RE silicate such as yttrium monosilicate or other RE monosilicate and/or yttrium disilicate; or other refractory metals, but with the first portion including an additive such as MgO, MgAlO, HfSiO, Mo, MoSi$_2$, SiAlON, and/or Al$_2$O$_3$, or a higher concentration of such an additive compared to the second portion. In some examples, the first portion may include at least about 5 weight percent (wt %), such as at least about 10 wt %, or up to 40 wt % of such an additive.

Additionally, or alternatively, the material of the first portion may have a higher void volume (e.g., being more porous) than compared to the material of the second portion. Such microstructure may be tailored by employing sacrificial elements within the composition of the first portion (e.g., in the form of polyester) that may be burned out during a subsequent processing step to form a relatively porous structure for the first portion and not the second portion. In some examples, one or more parameters of a deposition process such as a thermal spray process may be tailored to provide for the desired microstructure. Thus, the first portion may be made to be more susceptible to removal (e.g., based on CMAS attack) based on the chemistry/composition and/or the microstructure of the first portion compared to the second portion.

EXAMPLES

Figure 9:
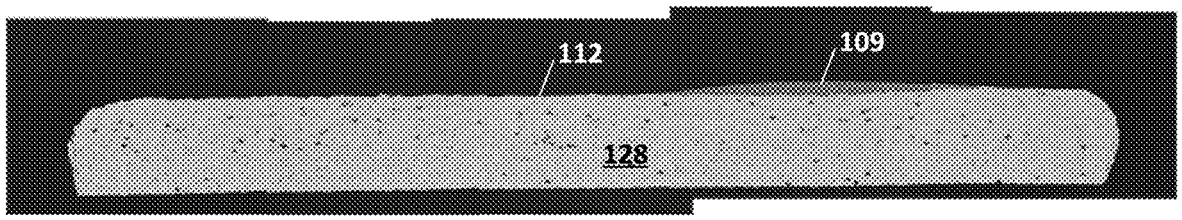
FIG. 9 illustrates an example CMAS resistant coating after exposure molten CMAS for eight hours, showing CMAS pooled on the surface and not penetrating the coating.

The interaction of molten CMAS on the outer surface of a coating of a component within a gas turbine engine was investigated. FIGS. 9-12 are images illustrating component with coatings 128 with various resistance to CMAS and levels of exposure to CMAS. As noted herein, a molten CMAS material 109 may collect on one or more outer surfaces of a component of a high temperature system. FIG. 9 is an image showing a CMAS resistant coating 128 for a CMC component of a gas turbine engine which has been exposed to molten CMAS 109 for 8 hours. The composition of coating 128 in FIGS. 9 and 10 was predominantly ytterbium disilicate with some amount of ytterbium monosilicate.

As shown, the CMAS 109 is pooled on the surface 112 of coating 128, slowly reacting and not penetrating the coating after 8 hours. The image of FIG. 9 demonstrates that CMAS and other molten materials, in some examples, require extended time on a surface of a coating (such as surface 12 of coating 28 for article 10 of FIG. 1) to react with the coating and cause deleterious effects. Promoting wicking or other flow of molten materials along the outer surface through the use of surface features/channels, such as the various example surface features and channels described herein, may assist in transporting molten CMAS to cooler downstream regions within the system. In the cooler regions, reaction rates may be relatively slower before the molten CMAS can react with an underlying barrier coating. Deleterious effects of CMAS and/or other molten materials may thus be reduced.

Figure 10:
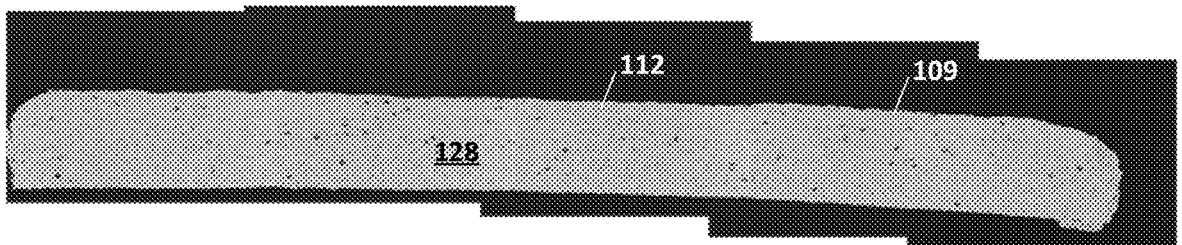
FIG. 10 illustrates the CMAS resistant coating of FIG. 9 after 96 hours, showing the molten CMAS beginning to react with and penetrate the coating.

FIG. 10 is an image illustrating the CMAS resistant barrier coating of FIG. 9 after 96 hours, showing the molten CMAS 109 beginning to react with and penetrate the coating 128. As shown, allowing molten CMAS 109 to contact the coating 128 for a longer period of time allows the CMAS 109 to further penetrate and react with the coating 128. FIGS. 9 and 10 demonstrate that reaction of molten materials with a substrate or substrate coating may be time dependent, and reducing the time molten materials interact with a surface of a coating such as surface 12 of articles 10, 40, and 50, by promoting transport of molten materials along surface 12 to cooler regions of a high temperature system may be desirable to preserve substrate or coating life.

Figure 11:
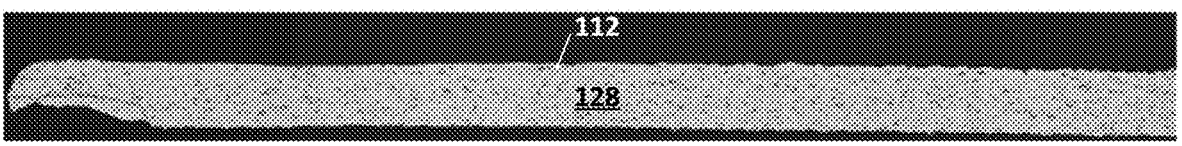
FIG. 11 illustrates an example CMAS susceptible coating with the molten CMAS absorbed into the coating.
Figure 12:
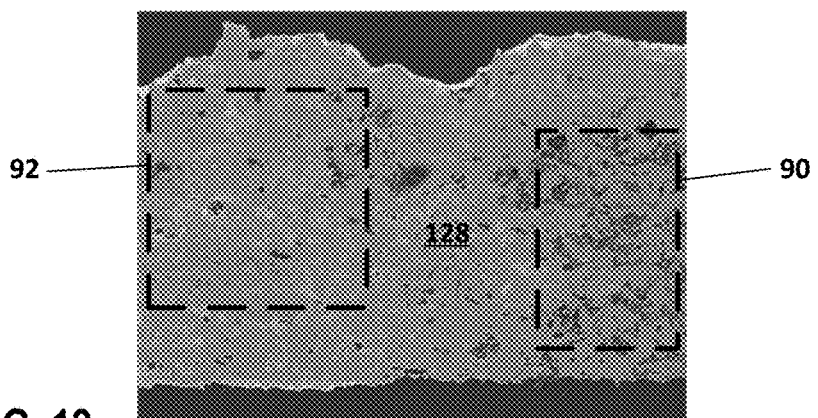
FIG. 12 is a closeup illustrating the CMAS susceptible coating of FIG. 9, showing the created microstructure and penetration of molten CMAS.

FIG. 11 is an image illustrating an example CMAS susceptible coating 128 with the same amount of molten CMAS as shown in FIG. 9 but with the CMSA absorbed into the coating 128. As shown, the coating 128 allows molten CMAS to penetrate into surface 112 the coating 128. In the example of FIGS. 11 and 12, coating 128 was a magnesium aluminate (MgAlO) layer.

FIG. 12 is a magnified image illustrating the CMAS susceptible coating of FIG. 11, showing a first portion 90 displaying an open microstructure (e.g., porosity) on the right side and a second portion 92 in which the coating (e.g., fully) penetrated by molten CMAS within the microstructure on the left side. The created microstructure may be prone to cracking and spallation, and may have reduced structural strength relative to a CMAS resistant coating.

As described above, in some examples, a coating may include one or more CMAS susceptible portions when an article is manufactured. During the operating life of the article, the susceptible portions may fail and be removed from the coating to define a plurality of surface features/ channels formed by the failure or other removal of the susceptible portions of the coating. As the CMAS susceptible coating is penetrated and reacted, the microstructure is created, the susceptible coating may crack and fall off, revealing the plurality of surface features/channels below. In this way, the surface features/channels may be on the part are initially but not revealed on the outer surface of a coating when the article is new, but may be exposed after the coating selectively fails, e.g., during the operating life of the article.

Various examples have been described. These and other examples are within the scope of the following clauses and claims.

Clause 1. An article comprising: a ceramic or ceramic matrix composite (CMC) substrate; and a coating on the ceramic or the CMC substrate, wherein the coating defines an outer surface of the article, wherein the coating includes a plurality of surface features defining channels on the outer surface of the article, wherein the channels are configured to modify a flow of molten Calcia-Magnesia-Alumina Silicate (CMAS) over the outer surface of the coating in a gas flow over the outer surface of the article to reduce accumulation of the molten CMAS on the outer surface of the article.

Clause 2. The article of clause 1, wherein the plurality of surface features includes one or more protrusions protruding out of a surface plane of the coating, and wherein the one or more protrusions define the channels on the outer surface of the article.

Clause 3. The article of clause 2, wherein respective channels on the outer surface of the coating are defined by neighboring individual protrusions of the one or more protrusions.

Clause 4. The article of clause 3, wherein the respective channels have a ramped surface between the neighboring individual protrusions.

Clause 5. The article of clause 1, wherein the plurality of surface features includes one or more recesses recessed into a surface plane of the coating, wherein the one or more recesses define the channels on the outer surface of the article.

Clause 6. The article of any one of clauses 2-5, wherein the channels are tapered in a direction of the gas flow over the outer surface.

Clause 7. The article of any one of clauses 1-6, wherein at least a portion the plurality of surface features are located at a trailing edge of the article relative to the gas flow.

Clause 8. The article of any one of clauses 1-6, wherein the coating includes an abradable coating, and wherein at least a portion the plurality of surface features are located adjacent a track formed into the abradable coating by the abrasion of an opposing abrasive member.

Clause 9. The article of clause 8, wherein a first set of surface features of the plurality of surface features are located adjacent to the track at an upstream edge of the track, and wherein a second set of surface features of the plurality of surface features are located adjacent to the track at a downstream edge of the track.

Clause 10. The article of clause 9, wherein the first set of surface features includes a plurality of protrusions protruding out of a surface plane of the article, and the second set of surface features includes a plurality of recesses recessed into the surface plane of the article.

Clause 11. The article of any one of clauses 1-10, wherein the coating includes a first portion that is more susceptible to CMAS attack as compared to a second portion of the coating, wherein the first portion is configured to, during operation of the article in a high temperature environment, be removed from the coating to define at least a portion of the plurality of surface features with the second portion.

Clause 12. The article of clause 11, wherein the first portion is more susceptible to CMAS attack based on at least one of a microstructure of the first portion or a composition of the first portion as compared to the second portion.

Clause 13. The article of any one of clauses 1-12, wherein the article is a component of a gas turbine engine configured to operate in a high temperature environment in which the molten CMAS is present.

Clause 14. The article of clause 13, wherein the component comprises at least one of a turbine blade, vane, or shroud.

Clause 15. The article of any one of clauses 1-14, wherein the plurality of surface features are configured to modify the flow of molten Calcia-Magnesia-Alumina Silicate (CMAS) over the outer surface of the coating by at least one of accumulating the molten CMAS in the channels, raise the molten CMAS above the surface plane of the coating into the gas flow, or drawing the molten CMAS to a trailing edge of the article.

Clause 16. The article of any one of clauses 1-15, wherein the coating includes an environmental barrier coating including a rare earth silicate.

Clause 17. A method comprising forming a coating on a ceramic or ceramic matrix composite (CMC) substrate, wherein the coating defines an outer surface of the article, wherein the coating includes a plurality of surface features defining channels on the outer surface of the article, wherein the channels are configured to modify a flow of molten Calcia-Magnesia-Alumina Silicate (CMAS) over the outer surface of the coating in a gas flow over the outer surface of the article to reduce accumulation of the molten CMAS on the outer surface of the article.

Clause 18. The method of clause 17, wherein the plurality of surface features includes one or more protrusions protruding out of a surface plane of the coating, and wherein the one or more protrusions define the channels on the outer surface of the article.

Clause 19. The method of clause 18, wherein respective channels on the outer surface of the coating are defined by neighboring individual protrusions of the one or more protrusions.

Clause 20. The method of clause 19, wherein the respective channels have a ramped surface between the neighboring individual protrusions.

Clause 21. The method of clause 17, wherein the plurality of surface features includes one or more recesses recessed into a surface plane of the coating, wherein the one or more recesses define the channels on the outer surface of the article.

Clause 22. The method of any one of clauses 18-21, wherein the channels are tapered in a direction of the gas flow over the outer surface.

Clause 23. The method of any one of clauses 17-22, wherein at least a portion the plurality of surface features are located at a trailing edge of the article relative to the gas flow.

Clause 24. The method of any one of clauses 17-22, wherein forming the coating includes forming an abradable coating, and wherein at least a portion the plurality of surface features are located adjacent a track formed into the abradable coating by the abrasion of an opposing abrasive member.

Clause 25. The method of clause 24, wherein a first set of surface features of the plurality of surface features are located adjacent to the track at an upstream edge of the track, and wherein a second set of surface features of the plurality of surface features are located adjacent to the track at a downstream edge of the track.

Clause 26. The method of clause 25, wherein the first set of surface features includes a plurality of protrusions protruding out of a surface plane of the article, and the second set of surface features includes a plurality of recesses recessed into the surface plane of the article.

Clause 27. The method of any one of clauses 17-26, wherein the coating includes a first portion that is more susceptible to CMAS attack as compared to a second portion of the coating, the method comprising removing the first portion from the coating during operation of the article in a high temperature environment to define at least a portion of the plurality of surface features with the second portion.

Clause 28. The method of clause 27, wherein the first portion is more susceptible to CMAS attack based on at least one of a microstructure of the first portion or a composition of the first portion as compared to the second portion.

Clause 29. The method of any one of clauses 17-28, wherein the article is a component of a gas turbine engine configured to operate in a high temperature environment in which the molten CMAS is present.

Clause 30. The method of clause 29, wherein the component comprises at least one of a turbine blade, vane, or shroud.

Clause 31. The method of any one of clauses 17-30, wherein the plurality of surface features are configured to modify the flow of the molten CMAS over the outer surface of the coating by at least one of accumulating the molten CMAS in the channels, raise the molten CMAS above the surface plane of the coating into the gas flow, or drawing the molten CMAS to a trailing edge of the article.

Clause 32. The method of any one of clauses 17-31, wherein the coating includes an environmental barrier coating including a rare earth silicate.

What is claimed is:

1. An article comprising:
a ceramic or ceramic matrix composite (CMC) substrate; and
a coating on the ceramic or the CMC substrate, wherein the coating defines an outer surface of the article, wherein the coating includes a first portion which does not include surface features and a second portion adjacent to the first portion, the second portion defining a plurality of surface features, the plurality of surface features defining channels on the outer surface of the article, wherein the channels are configured to modify a flow of molten Calcia-Magnesia-Alumina Silicate (CMAS) over the outer surface of the coating in a gas flow over the outer surface of the article to reduce accumulation of the molten CMAS on the outer surface of the article, wherein:
the plurality of surface features includes one or more protrusions protruding out of a surface plane of the coating, wherein the surface plane of the coating is defined by the first portion of the coating, and wherein the one or more protrusions define the channels on the outer surface of the article,
respective channels on the outer surface of the coating are defined by neighboring individual protrusions of the one or more protrusions, and
the respective channels have a ramped surface between the neighboring individual protrusions, wherein the ramped surface is a planar surface and defines a first point and a second point on the planar surface, wherein the first point and the second point are at different distances away from the surface plane of the coating along a line substantially parallel to the gas flow over the outer surface of the article, wherein the ramped surface defines an elevation change in a Z-direction relative to the surface plane of the coating such that the respective channels are recessed into or protrude out of the surface plane of the coating.

2. The article of claim 1, wherein the plurality of surface features includes one or more recesses recessed into the surface plane of the coating, wherein the one or more recesses define the channels on the outer surface of the article.

3. The article of claim 1, wherein the channels are tapered in a direction of the gas flow over the outer surface.

4. The article of claim 1, wherein at least a portion the plurality of surface features are located at a trailing edge of the article relative to the gas flow.

5. The article of claim 1, wherein the coating includes an abradable coating, and wherein at least a portion the plurality of surface features are located adjacent a track formed into the abradable coating by the abrasion of an opposing abrasive member.

6. The article of claim 5, wherein a first set of surface features of the plurality of surface features are located adjacent to the track at an upstream edge of the track, and wherein a second set of surface features of the plurality of surface features are located adjacent to the track at a downstream edge of the track.

7. The article of claim 6, wherein the first set of surface features includes a plurality of protrusions protruding out of a surface plane of the article, and the second set of surface features includes a plurality of recesses recessed into the surface plane of the article.

8. The article of claim 1, wherein the coating includes a first portion that is more susceptible to CMAS attack as compared to a second portion of the coating, wherein the first portion is configured to, during operation of the article in a high temperature environment, be removed from the coating to define at least a portion of the plurality of surface features with the second portion.

9. The article of claim 8, wherein the first portion is more susceptible to CMAS attack based on at least one of a microstructure of the first portion or a composition of the first portion as compared to the second portion.

10. The article of claim 1, wherein the article is a component of a gas turbine engine configured to operate in a high temperature environment in which the molten CMAS is present.

11. The article of claim 10, wherein the component comprises at least one of a turbine blade, vane, or shroud.

12. The article of claim 1, wherein the plurality of surface features are configured to modify the flow of molten Calcia-Magnesia-Alumina Silicate (CMAS) over the outer surface of the coating by at least one of accumulating the molten CMAS in the channels, raising the molten CMAS above the surface plane of the coating into the gas flow, or drawing the molten CMAS to a trailing edge of the article.

13. The article of claim 1, wherein the coating includes an environmental barrier coating including a rare earth silicate.

14. A method comprising forming a coating on a ceramic or ceramic matrix composite (CMC) substrate on an outer surface of an article, wherein the coating includes a a first portion which does not include surface features and a second portion adjacent to the first portion, the second portion defining a plurality of surface features, the plurality of surface features defining channels on the outer surface of the article, wherein the channels are configured to modify a flow of molten Calcia-Magnesia-Alumina Silicate (CMAS) over the outer surface of the coating in a gas flow over the outer surface of the article to reduce accumulation of the molten CMAS on the outer surface of the article, wherein:
  the plurality of surface features includes one or more protrusions protruding out of a surface plane of the coating, wherein the surface plane of the coating is defined by the first portion of the coating, and wherein the one or more protrusions define the channels on the outer surface of the article,
  respective channels on the outer surface of the coating are defined by neighboring individual protrusions of the one or more protrusions, and
  the respective channels have a ramped surface between the neighboring individual protrusions, wherein the ramped surface is a planar surface and defines a first point and a second point on the planar surface, wherein the first point and the second point are at different distances away from the surface plane of the coating along a line substantially parallel to the gas flow over the outer surface of the article, wherein the ramped surface defines an elevation change in a Z-direction relative to the surface plane of the coating such that the respective channels are recessed into or protrude out of the surface plane of the coating.

15. The method of claim 14, wherein the plurality of surface features includes one or more recesses recessed into the surface plane of the coating, wherein the one or more recesses define the channels on the outer surface of the article.

16. The method of claim 14, wherein the channels are tapered in a direction of the gas flow over the outer surface.

17. The method of claim 14, wherein at least a portion the plurality of surface features are located at a trailing edge of the article relative to the gas flow.

18. The method of claim 14, wherein the coating includes an abradable coating, and wherein at least a portion the plurality of surface features are located adjacent to a track formed into the abradable coating by the abrasion of an opposing abrasive member.

19. The method of claim 18, wherein a first set of surface features of the plurality of surface features are located adjacent to the track at an upstream edge of the track, and wherein a second set of surface features of the plurality of surface features are located adjacent to the track at a downstream edge of the track.

20. The method of claim 19, wherein the first set of surface features includes a plurality of protrusions protruding out of a surface plane of the article, and the second set of surface features includes a plurality of recesses recessed into the surface plane of the article.

* * * * *